US012562473B2

(12) United States Patent
Rashidian et al.

(10) Patent No.: US 12,562,473 B2
(45) Date of Patent: Feb. 24, 2026

(54) LGA- AND BGA-BASED PHASED-ARRAY MILLIMETER-WAVE ANTENNAS

(71) Applicant: PERASO TECHNOLOGIES INC., Toronto (CA)

(72) Inventors: Atabak Rashidian, Richmond Hill (CA); Mihai Tazlauanu, Markham (CA); Bradley Robert Lynch, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 569 days.

(21) Appl. No.: 18/048,536

(22) Filed: Oct. 21, 2022

(65) Prior Publication Data

US 2023/0125676 A1 Apr. 27, 2023

Related U.S. Application Data

(60) Provisional application No. 63/270,240, filed on Oct. 21, 2021.

(51) Int. Cl.
*H01Q 3/36* (2006.01)

(52) U.S. Cl.
CPC .................................... *H01Q 3/36* (2013.01)

(58) Field of Classification Search
CPC ..... H01Q 1/2283; H01Q 1/065; H01Q 1/0025
See application file for complete search history.

(56) References Cited

U.S. PATENT DOCUMENTS

| | | | | |
|---|---|---|---|---|
| 10,396,470 | B1 * | 8/2019 | Rashidian | H01Q 21/22 |
| 11,532,867 | B2 * | 12/2022 | Chuang | H01L 24/32 |
| 2016/0049723 | A1 * | 2/2016 | Baks | H01Q 9/0457 343/848 |
| 2018/0115056 | A1 | 4/2018 | Rashidian | |
| 2018/0159203 | A1 * | 6/2018 | Baks | H01Q 9/045 |
| 2018/0350772 | A1 | 12/2018 | Nair et al. | |
| 2019/0191597 | A1 | 6/2019 | Han et al. | |
| 2019/0207324 | A1 | 7/2019 | Teshima et al. | |
| 2019/0280368 | A1 | 9/2019 | Khan et al. | |
| 2019/0288382 | A1 | 9/2019 | Kamgaing et al. | |
| 2020/0021010 | A1 | 1/2020 | Ou et al. | |
| 2020/0035625 | A1 | 1/2020 | Wang et al. | |
| 2021/0013582 | A1 | 1/2021 | Rashidian et al. | |
| 2022/0083120 | A1 | 3/2022 | Ghoshal et al. | |

OTHER PUBLICATIONS

U.S. Appl. No. 16/925,831, Radio Frequency Modules With Millimeter-Wave Air-Gap Phased-Array Antenna, filed Jul. 10, 2020.

* cited by examiner

*Primary Examiner* — Awat M Salih
(74) *Attorney, Agent, or Firm* — Perry + Currier Inc.

(57) ABSTRACT

A radio frequency module includes: a primary board including: an upper surface carrying a radio controller; and a lower surface carrying antenna control elements; a plurality of spacing elements affixed to the lower surface and having a predetermined height extending away from the lower surface; and a secondary board affixed to the primary board by the plurality of spacing elements, separated from the lower surface of the primary board by an air gap with the predetermined height; the secondary board supporting a phased array of antenna elements electromagnetically coupled with the antenna control elements.

18 Claims, 6 Drawing Sheets

LGA- AND BGA-BASED PHASED-ARRAY MILLIMETER-WAVE ANTENNAS

CROSS-REFERENCE TO RELATED APPLICATION

This application claims priority from U.S. provisional patent application No. 63/270,240, filed Oct. 21, 2021 and entitled "LGA- and BGA-Based Phased-Array Millimeter-Wave Antennas", the contents of which is incorporated herein by reference.

FIELD

The specification relates generally to wireless communications, and specifically to air-gap phased-array antenna assemblies.

BACKGROUND

The performance of wireless antenna elements is dependent, in part, on the precision of antenna geometry and on the characteristics and geometry of the antenna substrate—the material between the antenna elements and the ground layer, which is typically a dielectric material supporting the antenna elements. Certain substrate materials, as well as assembly configurations, may provide superior performance characteristics to others, but may also be costlier to fabricate, have larger physical footprints, or both.

SUMMARY

An aspect of the specification provides a radio frequency module, comprising: a primary board including: an upper surface carrying a radio controller; and a lower surface carrying antenna control elements; a plurality of spacing elements affixed to the lower surface and having a predetermined height extending away from the lower surface; and a secondary board affixed to the primary board by the plurality of spacing elements, separated from the lower surface of the primary board by an air gap with the predetermined height; the secondary board supporting a phased array of antenna elements electromagnetically coupled with the antenna control elements.

BRIEF DESCRIPTIONS OF THE DRAWINGS

Embodiments are described with reference to the following figures, in which.

DETAILED DESCRIPTION

Figure 1A:
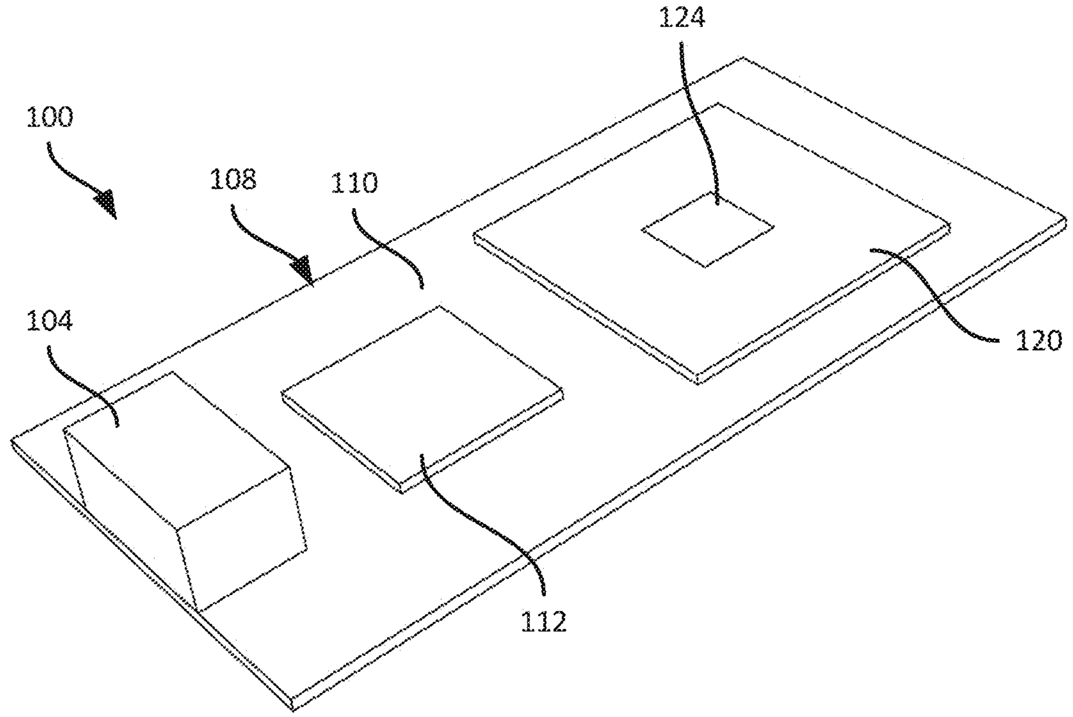
FIGS. 1A and 1B depict perspective views of a radio frequency module, from above and below.

FIG. 1A depicts an example wireless communications assembly 100, also referred to as a radio frequency (RF) module 100 or simply the module 100, in accordance with the teachings of this disclosure. The module 100, in general, is configured to enable wireless data communications between computing devices (not shown). In the present example, the wireless data communications enabled by the module 100 are conducted according to the Institute of Electrical and Electronics Engineers (IEEE) 802.11ay standard, also referred to as WiGig, which employs frequencies of about 57 GHz to about 71 GHz (across six channels, each with a bandwidth of about 2 GHz). As will be apparent, however, the module 100 may also enable wireless communications according to other suitable standards, employing other frequency bands.

Antenna assemblies configured to communicate via standards such as WiGig may be subject to competing constraints. A first example of such constraints includes strict fabrication tolerances to provide desired performance attributes such as antenna bandwidth (e.g. to cover all six of the above-mentioned channels). A second example constraint is a reduction in production complexity and cost. As will be apparent to those skilled in the art, the above constraints may be in conflict, in that fabricating wireless communications assemblies to satisfy strict tolerances tends to increase cost and complexity of fabrication. As will be discussed below, the wireless communications module 100 includes various features to enable the provision of certain desirable performance attributes (such as full spectrum coverage of the WiGig frequency band) while mitigating the impact on fabrication cost and complexity that would typically be associated with such performance attributes.

The module 100 can be integrated with a computing device, or in other examples, can be implemented as a discrete device that is removably connected to a computing device. In examples in which the module 100 is configured to be removably connected to a computing device, the module 100 includes a communications interface 104, such as a Universal Serial Bus (USB) port, configured to connect the remaining components of the module 100 to a host computing device (not shown).

The module 100 includes a primary board 108, which may also be referred to as a primary support. In the present example, the primary board 108 is a printed circuit board (PCB), for example fabricated with FR4 material, carrying either directly or via additional boards, the remaining components of the module 100. In particular, the primary board 108 carries, e.g. on an upper surface 110 thereof, the above-mentioned communications interface 104. The upper surface 110 is referred to as "upper" to distinguish from the opposing surface, to be discussed below, and does not indicate a required orientation of the module 100 in use.

The primary board 108 also carries, on the upper surface 110, a baseband controller 112. The baseband controller 112 is implemented as a discrete integrated circuit (IC) in the present example, such as a field-programmable gate array (FPGA). In other examples, the baseband controller 112 may be implemented as two or more discrete components. In further examples, the baseband controller 112 can be integrated within the primary board 108 (i.e. be defined within the conductive layers of the primary board 108) rather than carried on the upper surface 110.

In the present example, the baseband controller 112 is connected to the primary board 108 via any suitable surface-mount package, such as a ball-grid array (BGA) package that electrically couples the baseband controller 112 to signal paths (also referred to as leads, traces and the like) formed within the primary board 108 and connected to other components of the module 100. For example, the primary board 108 defines signal paths (not shown) between the baseband controller 112 and the communications interface 104. Via such signal paths, the baseband controller 112 transmits data received at the module 100 to the communications interface for delivery to a host computing device, and also receives data from the host computing device for wireless transmission by the module 100 to another computing device. Further, the primary board 108 defines additional signals paths extending between the baseband controller 112 and further components of the module 100, to be discussed below.

The module 100 further includes an interposer 120 carrying a radio controller 124. The interposer 120 is a discrete component mounted on the upper surface 110 via a suitable surface-mount package (e.g. BGA). The interposer 120 itself carries the radio controller 124, and contains signal paths (also referred to as feed lines) for connecting control ports of the radio controller 124 to the baseband controller 112, and for connecting further control ports of the radio controller 124 to antenna elements to be discussed in greater detail below. The radio controller 124 may, for example, be placed onto or into the interposer 120 via a pin grid array (PGA) or other suitable surface-mount package.

The module 100 may include a heatsink (not shown) placed over the baseband controller 112, the interposer 120 and the radio controller 124, and in contact with upper surfaces of those components, e.g. to exhaust heat generated by the components. In other examples, separate heat sinks may be placed over the baseband controller 112, and the combination of the interposer 120 and radio controller 124.

The radio controller 124 includes a transmitting port and a receiving port for connection, via the interposer 120 and traces defined by the primary board 108, to the baseband controller 112. The radio controller 124 also includes a plurality of antenna ports for connection, via the interposer 120, to corresponding radio control contacts on the upper surface 110 of the primary board 108. Those contacts, in turn, are connected to elements on the opposing lower surface of the primary board 108, to carry signals between the radio controller 124 and the above-mentioned antenna elements.

Figure 1B:
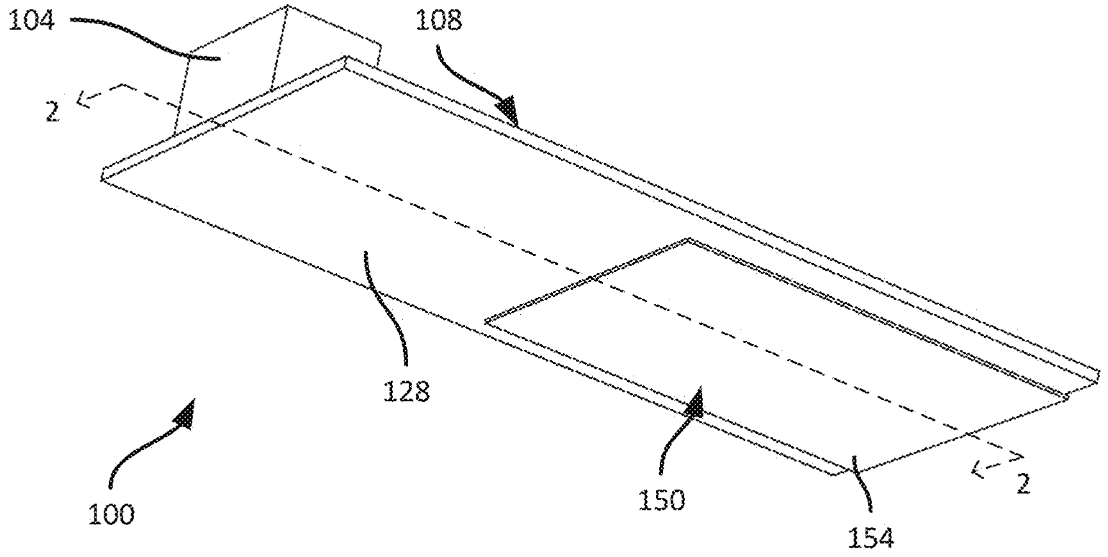

Turning to FIG. 1B, a lower surface 128 of the primary board 108 is shown opposite the upper surface 110. The above-mentioned antenna elements, such as a phased array of sixty-four antenna elements (although other arrangements of antenna elements are also contemplated), are supported on a secondary board 150, also referred to as a secondary support 150. The secondary board 150 includes an outer surface 154 (i.e. a surface facing away from the primary board 108) and an opposing inner surface (not visible in FIG. 1B) facing the primary board 108, and specifically, facing towards the lower surface 128 of the primary board 108. The antenna elements may be supported on the inner surface of the secondary board 150 in the present example. In other examples, however, the antenna elements may be supported on the outer surface 154 of the secondary board 150.

The module 100 includes additional components coupling the secondary board 150 to the primary board 108, which are not illustrated in FIG. 1B for simplicity, but are shown in subsequent figures and described below in greater detail.

Figure 2:
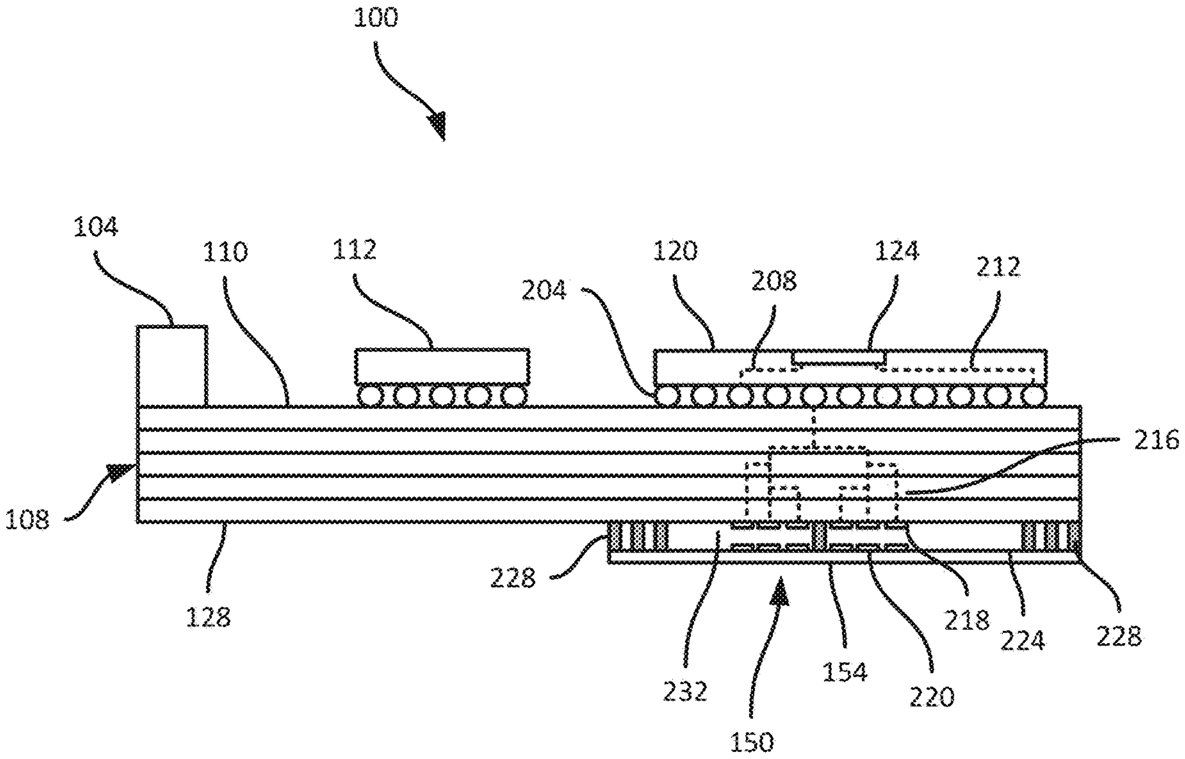
FIG. 2 depicts a cross-section of the module of FIG. 1.

Turning to FIG. 2, the cross-section 2-2 indicated in FIG. 1B is illustrated. As seen in FIG. 2, the interposer 120 is connected to the upper surface 110 via a surface-mount package 204, which in the present example is a BGA package. The interposer 120 contains a plurality of internal feed lines, examples 208 and 212 of which are shown in FIG. 2, connecting control ports of the radio controller 124 to elements of the package 204 for electrical connection with control contacts on the upper surface 110. At least a portion of the control contacts on the upper surface 110 are connected to conduits extending through the primary board 108 from the upper surface 110 to the lower surface 128.

The conduits 216, also referred to as a feed network, convey signals from the radio controller 124 to a series of excitation patches or other antenna patch control elements 218 on the lower surface 128, which are electromagnetically coupled to a series of antenna elements 220 disposed on an inner surface 224 of the secondary board 150 (e.g. the above-mentioned 64-element array). In other examples, the antenna elements 220 can be disposed on the outer surface 154 of the secondary board 150. The conduits 216 therefore also carry signals from the antenna elements 220, via the excitation patches, to the radio controller 124. As will be discussed in greater detail herein, the conduits 216 may connect to first subset of contacts at the upper surface 110 with a larger subset of contacts (i.e. having a greater number of contacts than the first subset) at the lower surface 128 (e.g. sixty-four, corresponding to the number of excitation patches deployed to power the sixty-four-element antenna array on the secondary board 150).

The secondary board 150 is affixed to the lower surface 128 of the primary board 108 by a plurality of spacing elements 228 (the scale of which is exaggerated for visibility in FIG. 2). The spacing elements 228 can be BGA elements, land grid array (LGA) elements (i.e., LGA contact pads), or copper pillars and can therefore be fabricated with the primary board 108 or with the secondary board 150. Fabrication of BGA and LGA elements can be automated and may therefore have limited impact on the fabrication cost and complexity of the assembly 100. Further, LGA and BGA elements can be fabricated to selectable heights, forming an air gap 232 between the inner surface 224 of the secondary board 150 and the lower surface 128 of the primary board 108. The air gap 232 provides sufficient impedance bandwidth for the antenna array carried by the secondary board 150. In addition, the dimensions (particularly the depth, as in the distance between the surfaces 128 and 224) of the air gap may be tightly controlled through fabrication of the spacing elements 228. For example, the depth of the air gap 232 can be between about 50 micrometers and about 200 micrometers, e.g., about 100 micrometers.

Figure 3:
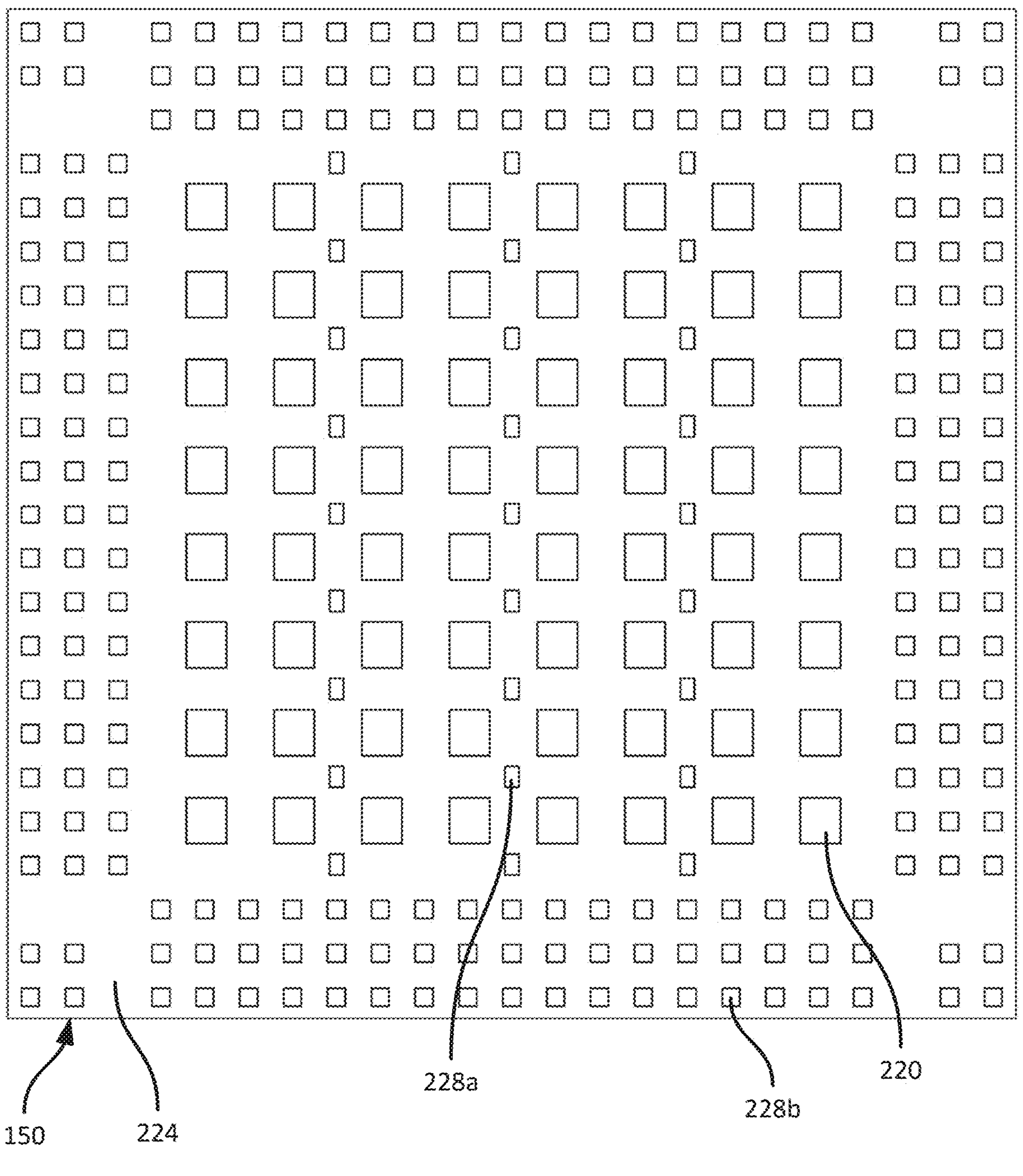
FIG. 3 depicts an overhead view of an inner surface of the secondary board of the module of FIG. 1.

Turning to FIG. 3, an example arrangement of spacing elements 228 on the inner surface 224 of the secondary board 150 is illustrated. The arrangement shown in FIG. 3 can be fabricated as an array of LGA elements, and includes a first subset of LGA elements 228*a*, and a second subset of LGA elements 228*b*. The elements of the subset 228*a* can be disposed within a perimeter of the antenna elements 220, e.g., in the spaces between antenna elements 220. The elements of the subset 228*b*, on the other hand, can be disposed around the perimeter of the antenna elements 220, e.g., adjacent to the edges of the secondary board 150.

In the illustrated example, the elements of the subsets 228*a* and 228*b* have different dimensions (in a plane parallel to the inner surface 224). In particular, the elements of the subset 228*a* may have a greater length (e.g., shown vertically in FIG. 3) than a length of the elements in the subset 228*b*, but a smaller width (e.g., shown horizontally in FIG. 3) than a width of the elements in the subset 228*b*. In this example, the elements of the subset 228*b* are square, while the elements of the subset 228*a* are rectangular. The elements 228 both affix the secondary board 150 to the primary board 108, and provide sufficient structural stability to the secondary board 150 to mitigate warping of the secondary board 150. The elements 228 can be grounded, e.g., via conductive traces in the primary board connecting the elements 228 to a ground layer of the primary board 108.

Figure 4:
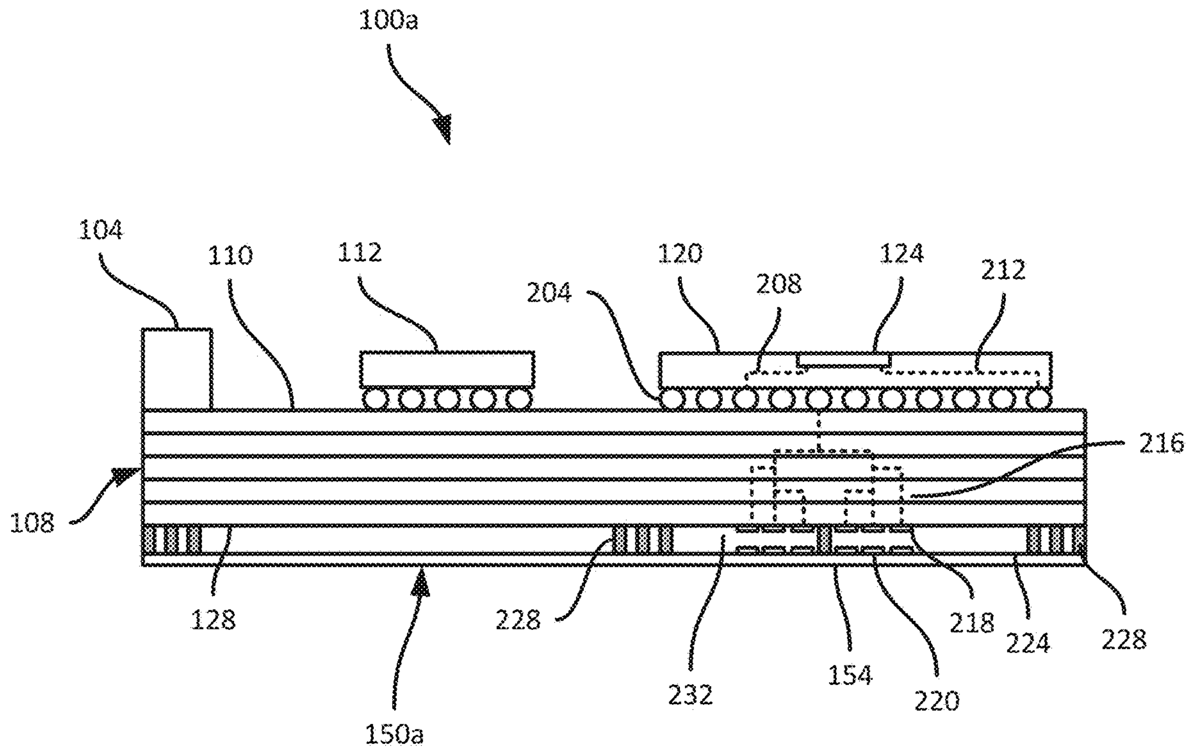
FIG. 4 depicts a cross-section of another example radio frequency module.

In the examples illustrated in FIGS. 1-3, the secondary board 150 is smaller than the primary board 108, e.g., having an area of about half the area of the primary board 108. In other examples, however, the secondary board 150 can extend across substantially one entire side of the primary board 108, as shown in FIG. 4. In particular, FIG. 4 illustrates a radio frequency module 100*a* with a secondary board 150*a* that is elongated, relative to the secondary board 150, so as to substantially cover the entire lower surface 128 of the primary board 108. The secondary board 150*a* can therefore act as a protective cover for the primary board 108, in addition to hosting the antenna elements 220. In the implementation of FIG. 4, additional spacing elements 228 (e.g., LGA or BGA elements) can be employed to affix the secondary board 150*a* to the primary board 108, as well as stiffen the secondary board 150*a* against warping.

Figure 5A:
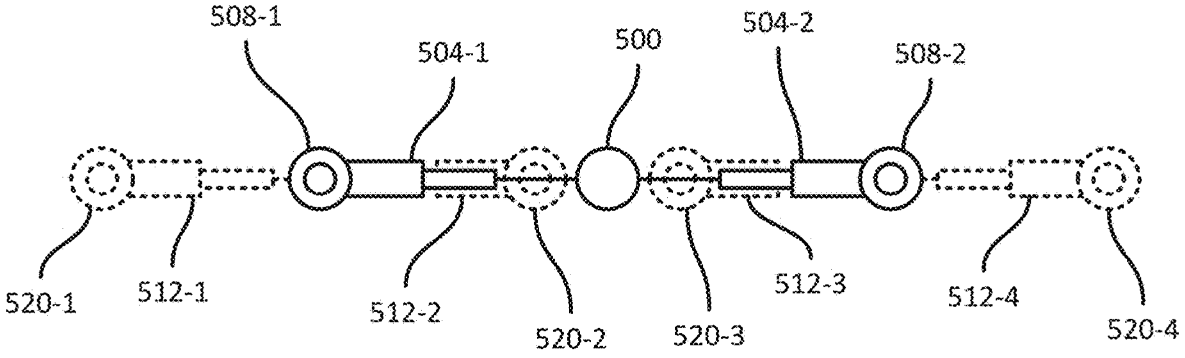
FIG. 5A depicts an overhead view of a feed network of the module of FIG. 1.
Figure 5B:
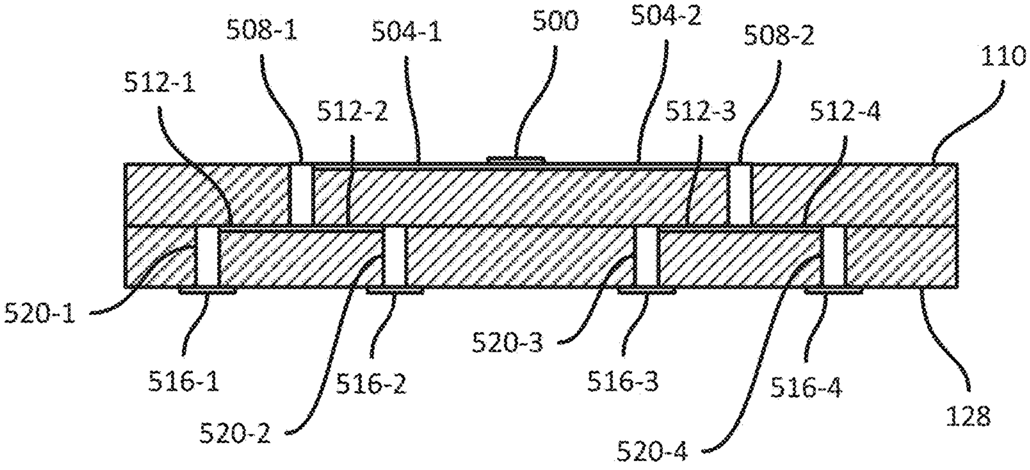
FIG. 5B depicts a cross-sectional view of the feed network of FIG. 5A.

As noted earlier, the conduits 216 allow the exchange of signals between the antenna elements 220 (via the excitation patches on the lower surface 128) and the radio controller 124, by subdividing a first set of contacts on the upper surface 110 into a larger second set of contacts on the lower surface 128. Turning to FIGS. 5A and 5B, a simplified example set of conduits is shown in an overhead view (FIG. 5A) and a cross-sectional view (FIG. 5B).

The simplified feed networks in FIGS. 5A and 5B illustrate a first contact 500, e.g. on the upper surface 110, and connected to the radio controller 124 via the interposer 120. From the contact 500, feed lines (e.g. which may have wider traces as they depart from the contact 500) 504-1 and 504-2 travel to vias 508-1 and 508-2 (which may also be referred to as intermediate contacts). The vias 508 carry signals to a second conductive layer (e.g. separated from the conductive layer carrying the contact 500 by a dielectric core layer). On the second layer, additional feed lines 512-1, 512-2, 512-3, and 512-4 carry signals to excitations patches 516-1, 516-2, 516-3, and 516-4 through vias 520-1, 520-2, 520-3, and 520-4.

A wide variety of other structures for the conduits 216 can also be deployed. In general, as seen in FIGS. 5A and 5B, the stacked arrangement of conduits contemplated herein is more compact than an entirely planar feed network (e.g. contained entirely in one conductive layer), and may therefore reduce the complexity and cost of fabricating a primary board 108 with a set of excitation patches on the lower surface 108 with the spacing and placement to power the antenna elements 220.

Figure 6A:
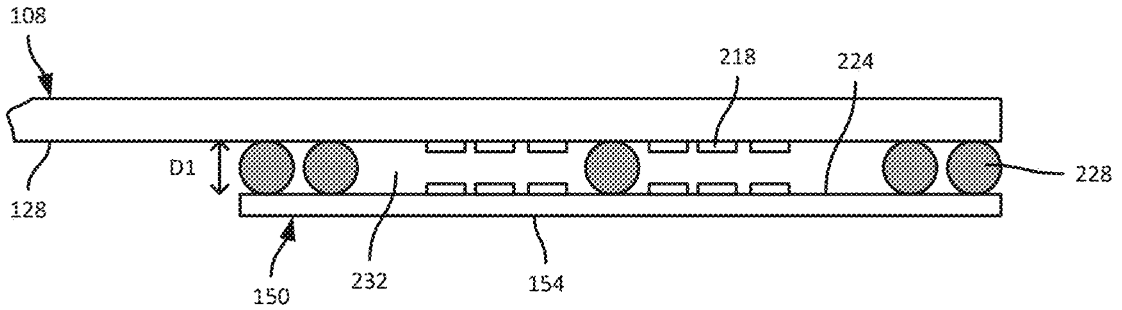
FIG. 6A depicts a cross-sectional view of a portion of an example radio frequency module, using BGA elements as spacers.
Figure 6B:
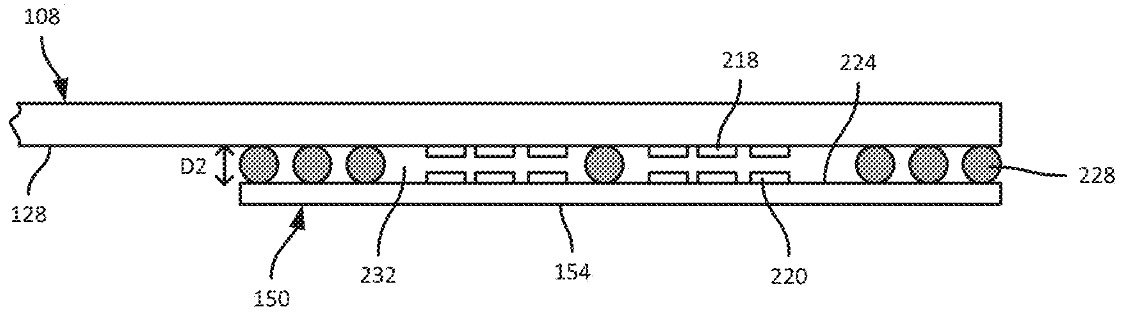
FIG. 6B depicts a cross-sectional view of a portion of another example radio frequency module, using BGA elements as spacers.

As noted earlier, the secondary board 150 can also be affixed to the primary board 108 using BGA elements rather than LGA elements. While LGA elements provide a degree of flexibility in length and width, the height of the LGA elements may be relatively restricted (e.g., limited to about 100 microns). BGA elements, in contrast, may provide greater flexibility in terms of height, allowing further tuning of the depth of the air gap 232. For example, FIG. 6A illustrates an embodiment in which BGA elements having a diameter D1 are used as spacing elements 228. The air gap 232 has a depth substantially equal to the diameter D1. FIG. 6B illustrates another embodiment with smaller BGA elements used as spacing elements 228. The BGA elements shown in FIG. 6B have a diameter D2, and the air gap 232 in FIG. 6B is therefore also smaller than the air gap 232 shown in FIG. 6A. The number and arrangement of the BGA elements may also be varied along with the diameter of the BGA elements.

Certain configurations of the module 100 for use in WiGig communications achieve reflection coefficients below −10 dB for frequencies between 56.5 GHz and 72 GHz (i.e. across substantially the entire WiGig spectrum). That is, all six WiGig channels may be employed by such an assembly. Further, the assembly configurations noted above may achieve gain up to 23 dBi. Still further, such an assembly may be steered over angles of 30 degrees to either side of a center orientation with a decrease in signal strength of less than about 4 dB.

The scope of the claims should not be limited by the embodiments set forth in the above examples, but should be given the broadest interpretation consistent with the description as a whole.

The invention claimed is:

1. A radio frequency module, comprising:

a primary board including:

an upper surface carrying a radio controller;

a lower surface carrying antenna control elements; and a baseband controller to transmit data received at the radio frequency module;

a plurality of spacing elements affixed to the lower surface and having a predetermined height extending away from the lower surface;

a secondary board affixed to the primary board by the plurality of spacing elements, separated from the lower surface of the primary board by an air gap with the predetermined height; the secondary board supporting a phased array of antenna elements electromagnetically coupled with the antenna control elements; and an interposer mounted on the upper surface and carrying the radio controller, the interposer comprising a plurality of internal feed lines configured to connect a control port of the radio controller to the baseband controller.

2. The radio frequency module of claim 1, wherein the plurality of spacing elements include land grid array (LGA) elements with the predetermined height.

3. The radio frequency module of claim 2, wherein the plurality of LGA elements includes a first subset of LGA elements having a first length, and a second subset of LGA elements having a second length smaller than the first length.

4. The radio frequency module of claim 3, wherein the first subset of LGA elements have a first width, and wherein the second subset of LGA elements have a second width greater than the first width.

5. The radio frequency module of claim 3, wherein the second subset of LGA elements are square.

6. The radio frequency module of claim 3, wherein the second subset of LGA elements are disposed around a perimeter of the phased array of antenna elements.

7. The radio frequency module of claim 3, wherein the first subset of LGA elements are disposed within the perimeter of the phased array of antenna elements.

8. The radio frequency module of claim 1, wherein the predetermined height is between about 50 micrometers and about 200 micrometers.

9. The radio frequency module of claim 1, wherein the plurality of spacing elements include ball grid array (BGA) elements, each BGA element having a diameter equal to the predetermined height.

10. The radio frequency module of claim 9, wherein the plurality of BGA elements include a first subset of BGA elements disposed around a perimeter of the phased array of antenna elements, and a second subset of BGA elements disposed within the perimeter of the phased array of antenna elements.

11. The radio frequency module of claim 1, further comprising a communications interface on the upper surface of the primary board.

12. The radio frequency module of claim 1, wherein the communications interface comprises a Universal Serial Bus (USB) interface.

13. The radio frequency module of claim 1, wherein the phased array of antenna elements is controllable to receive and transmit signals at frequencies between about 57 GHz and about 71 GHz.

14. The radio frequency module of claim 1, further comprising:
- a plurality of radio controller contacts on the upper surface of the primary board;
- a feed network connecting the radio controller contacts with the antenna control elements, the feed network including:
  - a first layer connecting the radio controller contacts to a set of intermediate contacts between the upper surface and the lower surface, wherein the intermediate contacts are greater in number than the radio controller contacts; and
  - a second layer connecting the set of intermediate contacts to the antenna control elements.

15. The radio frequency module of claim 1, wherein the secondary board has an area smaller than an area of the primary board.

16. The radio frequency module of claim 1, wherein the second board has an area substantially equal to an area of the primary board.

17. The radio frequency module of claim 16, wherein the phased array of antenna elements are disposed in a portion of the area of the secondary board smaller than one half of the area.

18. The radio frequency module of claim 1, wherein the plurality of spacing elements include conductive pillars with the predetermined height.

* * * * *